United States Patent
Kresh

(10) Patent No.: US 12,495,184 B1
(45) Date of Patent: Dec. 9, 2025

(54) VISUAL CONTENT REPLACEMENT SYSTEM AND METHOD

(71) Applicant: BlokTv IP LLC, Dallas, TX (US)

(72) Inventor: Herbert N Kresh, Dallas, TX (US)

(73) Assignee: N.E.R.D.S. LLC, Dallas, TX (US)

( * ) Notice: Subject to any disclaimer, the term of this patent is extended or adjusted under 35 U.S.C. 154(b) by 0 days.

(21) Appl. No.: 18/486,645

(22) Filed: Oct. 13, 2023

Related U.S. Application Data

(60) Provisional application No. 63/417,246, filed on Oct. 18, 2022.

(51) Int. Cl.
  *H04N 21/454* (2011.01)
  *G09G 5/00* (2006.01)
  *H04N 5/14* (2006.01)
  *H04N 21/44* (2011.01)

(52) U.S. Cl.
  CPC ......... *H04N 21/4542* (2013.01); *G09G 5/006* (2013.01); *H04N 5/147* (2013.01); *H04N 21/44008* (2013.01); *G09G 2370/12* (2013.01)

(58) Field of Classification Search
  CPC ............... H04N 21/4542; H04N 5/147; H04N 21/44008; G09G 5/006
  See application file for complete search history.

(56) References Cited

U.S. PATENT DOCUMENTS

| | | | |
|---|---|---|---|
| 6,100,941 A * | 8/2000 | Dimitrova | G06F 16/7328 348/700 |
| 7,930,714 B2 | 4/2011 | Konig et al. | |
| 8,064,819 B2 | 11/2011 | Ingrassia et al. | |
| 8,249,497 B2 | 8/2012 | Ingrassia et al. | |
| 9,197,335 B2 | 11/2015 | Smereka et al. | |
| 9,305,308 B2 | 4/2016 | Smereka et al. | |
| 9,508,090 B1 * | 11/2016 | Belser | G06Q 30/0273 |
| 9,621,929 B1 | 4/2017 | Chenillo et al. | |
| 10,932,011 B2 | 2/2021 | Littlejohn | |
| 11,108,480 B2 | 8/2021 | Littlejohn | |
| 11,451,872 B1 * | 9/2022 | Spencer | H04N 21/4147 |
| 2004/0194130 A1 * | 9/2004 | Konig | H04N 7/16 725/135 |
| 2006/0130119 A1 * | 6/2006 | Candelore | H04N 7/163 725/135 |

(Continued)

*Primary Examiner* — Nnenna N Ekpo
(74) *Attorney, Agent, or Firm* — AVEK IP, LLC

(57) ABSTRACT

A visual content replacement system includes a visual device with a screen; a digital device in communication with the visual device and having a processing unit to execute software instructions; a server providing the software instructions; the processing unit and software instructions scan a stream of visual content being actively displayed on the screen; determine when the stream of visual content includes a first trigger indicating a first transition within the stream of visual content from a user desired visual content to a designated undesirable visual content; replace the designated undesirable visual content with a replacement content; scan the stream of visual content; determine when the stream of visual content includes a second trigger indicating a transition from the designated undesirable visual content back to the user desired visual content; pushing the stream of visual content back to the screen to display the user desired visual content.

18 Claims, 9 Drawing Sheets

(56) References Cited

U.S. PATENT DOCUMENTS

| | | | |
|---|---|---|---|
| 2006/0130121 A1* | 6/2006 | Candelore | H04N 21/8541 |
| | | | 725/115 |
| 2009/0077580 A1 | 3/2009 | Konig et al. | |
| 2010/0060910 A1* | 3/2010 | Fechter | G06V 30/412 |
| | | | 358/1.9 |
| 2010/0332988 A1 | 12/2010 | Fong et al. | |
| 2013/0102241 A1 | 4/2013 | Devine et al. | |
| 2015/0163545 A1* | 6/2015 | Freed | H04N 21/8456 |
| | | | 725/19 |
| 2018/0027269 A1 | 1/2018 | Chenillo et al. | |
| 2020/0245380 A1* | 7/2020 | Hruby | H04W 76/10 |
| 2020/0413139 A1* | 12/2020 | Ickin | H04N 21/2187 |
| 2023/0105785 A1* | 4/2023 | Yang | G06V 10/25 |
| | | | 382/103 |

* cited by examiner

VISUAL CONTENT REPLACEMENT SYSTEM AND METHOD

RELATED APPLICATIONS

This application claims priority to U.S. Provisional Application No. 63/417,246, filed Oct. 18, 2022, which is incorporated by reference in its entirety herein.

FIELD OF INVENTION

The disclosure relates generally to entertainment systems. More specifically, the disclosure relates to a system and method to detect undesirable visual and/or audio content and replace the undesirable content with user preferred content. Yet more specifically, in embodiments, the present disclosure includes a system and method to detect television commercials automatically and replace said commercials with user preferred content.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

According to an embodiment of the current disclosure, the invention includes a visual content replacement system, comprising a visual device with a screen; a digital device in digital communication with the visual device, the digital device having a processing unit to execute one or more software instructions therefrom; and a server in digital communication with the digital device, the server providing the one or more software instructions for execution by the processing unit. The processing unit, in combination with the one or more software instructions, performing the steps of: scanning a stream of visual content being actively displayed on the screen of the visual device; determining when the stream of visual content includes a first trigger, the first trigger indicating a first transition within the stream of visual content from a user desired visual content to a designated undesirable visual content; replacing the designated undesirable visual content with a replacement content on the screen of the visual device; continuing scanning of the stream of visual content; determining when the stream of visual content includes a second trigger, the second trigger indicating a second transition within the stream of visual content from the designated undesirable visual content back to the user desired visual content; pushing the stream of visual content back to the screen of the visual device such that the screen of the visual device displays the user desired visual content; and continuing scanning of the stream of visual content for a third trigger.

In yet another embodiment of the current disclosure, the invention includes a method of replacing visual content, the method comprises providing a digital device with a processing unit configured to execute one or more software instructions, the digital device in digital communication with a server; connecting the digital device with a visual device such that the digital device receives data from the visual device related to a stream of visual content; scanning the stream of visual content being actively displayed on a screen of the visual device via the digital device; determining when the stream of visual content includes a first trigger via the one or more software rules, the first trigger indicating a first transition within the stream of visual content from a user desired visual content to a designated undesirable visual content; replacing the designated undesirable visual content with a replacement content on the screen of the visual device via the digital device; continuing scanning of the stream of visual content via the digital device; determining when the stream of visual content includes a second trigger via the one or more software rules, the second trigger indicating a second transition within the stream of visual content from the designated undesirable visual content back to the user desired visual content; pushing the stream of visual content back to the screen of the visual content via the digital device such that the screen of the visual device displays the user desired visual content; and continuing scanning of the stream of visual content for a third trigger.

BRIEF DESCRIPTION OF THE DRAWINGS

Embodiments of the invention are described in detail below with reference to the attached drawings.

Figure 1:
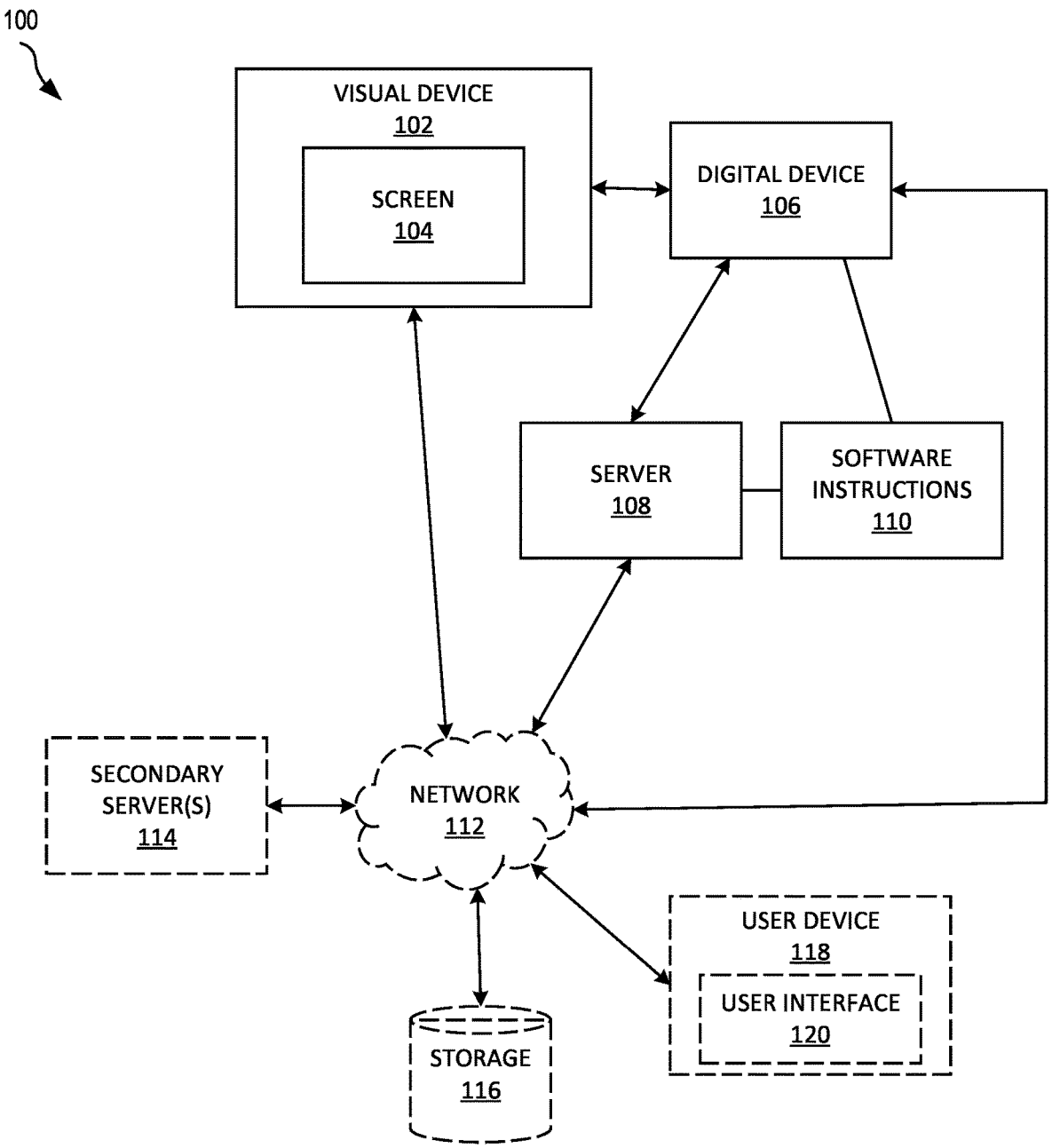
FIG. 1 is a schematic of a visual content replacement system in accordance with the present invention.

The drawings do not limit the invention to the specific embodiments disclosed and described herein. The drawings are not necessarily to scale, emphasis instead being placed upon clearly illustrating various principles of the disclosure.

DETAILED DESCRIPTION

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Visual content consumption is common in almost every household, as well as in commercial establishments. Specifically, many individuals consume visual content through a television, the television connected to one or more third party systems, such as platforms including Netflix®, Hulu®, YouTube®, as well as other streaming services, such as through cable, internet, live tv streaming, and local antenna received content. Those skilled in the art can appreciate that this listing is only a small example of potential sources of visual content.

Depending on the service or third party being used, it is common for the service to include advertisements. These advertisements are commonly in the form of commercials that interrupt the desired visual content for a period of time. As one example, a user may be watching a sporting event on their television, when during the sporting event, a pause in the event occurs, and the television network switches to a series of commercials before returning to the sporting event. As another example, a user may be watching a streamed movie through a platform, cable connection, or smart TV internet connection, wherein periodically the streamed movie is paused for one or more commercials or advertisements. Once the commercials or advertisements end, the movie will resume.

It is common for these advertisements to be an annoyance for the user and include content undesirable and even irrelevant for the user. Accordingly, it is desirable for this content to be muted or replaced by user desirable content, such as a screensaver, music, other visual content, or the like.

Accordingly, the present invention provides for a system and method to replace these advertisements with user desired content. The following definitions should be considered as part of this disclosure to aid in the understanding of the system and method discussed herein:

Stream of visual content-A selection of visual content by the user that is being pushed to a screen of the visual device (e.g. television) by one of: a third party device, a third party platform, a cable company, an internet based visual content provider, or any other source of visual content. This stream of visual content is being monitored by a digital device of the present invention.

User desired visual content-A portion of the stream of visual content that the user is desirous of consuming. A first example of user desired visual content is a movie selected by the user that is part of the stream of visual content. A second example of user desired visual content is a sporting event as part of the stream of visual content.

Designated undesirable visual content-A portion of the stream of visual content that the user does not desire to consume. As an example, one or more commercials as part of a commercial break of the stream of visual content.

Replacement content-Content in any form that the user has designated to replace the designated undesirable visual content. The replacement content may be visual based, audio based, or a combination of the two. The replacement content is not part of the stream of visual content, but rather is obtained from a second source, such as a server, and configurable by the digital device of the present invention to replace the designated undesirable visual content. As an example, replacement content may be a screensaver that replaces the designated undesirable visual content.

Turning now to FIG. 1, a schematic of a visual content replacement system 100 is shown. System 100 includes a visual device 102 with a screen 104. Those skilled in the art will appreciate that the visual device 102 with a screen 104 is any electronic device configured to present the user with visual content, for example, a television, computer, tablet, a biologically simulated screen, or any other electronic device now known or developed in the future.

A digital device 106 is connected to the visual device 102 and is configured to monitor a stream of visual content and replace designated undesirable visual content with replacement content, as will be discussed in more detail herein. The digital device 106 may be physically connected to the visual device 102, such as through one or more connection ports, or may be in wireless communication with the visual device 102, such as through Wi-Fi, Bluetooth, RFID, or other technologies.

A server 108 is in communication with the digital device 106 and supplies one or more software instructions 110 to the digital device 106 for implementation of commands. It should be appreciated that the software instructions 110 may be partially contained on the server 108 and/or the digital device 106, as would be understood by those skilled in the art. The software instructions 110 may be machine readable instructions configured to be executed by the digital device 106, and may include any number of machine learning algorithms and trained modules, including but not limited to deep learning models (also known as deep machine learning, or hierarchical models) that have been trained to perform image and audio recognition tasks. Machine learning is used to refer to the various classes of artificial intelligence algorithms and algorithm-driven approaches that are capable of performing machine-driven (e.g., computer-aided) identification of trained structures, and deep learning is used to refer to a multiple-level operation of such machine learning algorithms using multiple levels of representation and abstraction. The artisan will understand that the role of the machine learning algorithms that are applied, used, and configured as described may be supplemented or substituted by any number of other algorithm-based approaches, including variations of artificial neural networks, learning-capable algorithms, trainable object classifications, and other artificial intelligence processing techniques.

In embodiments, a network 112 may further be communicatively coupled to one or more of the server 108, digital device 106, and visual device 102. The network may provide remote storage 116 and may further provide a communication link to one or more secondary servers 114 and/or one or more user devices 118 with interactive user interfaces 120. For example, user device(s) 118 may include any combination of hardware and software components for receiving and processing information, such as a smart phone, remote control, tablet, or computer. The user device(s) 118 will provide a user with management operations associated with the digital device 106. For example, the user may be able to configure the digital device 106 with what they deem undesirable visual content and replacement content and make additional customizations and modifications for implementation of the methods discussed herein.

Figure 2:
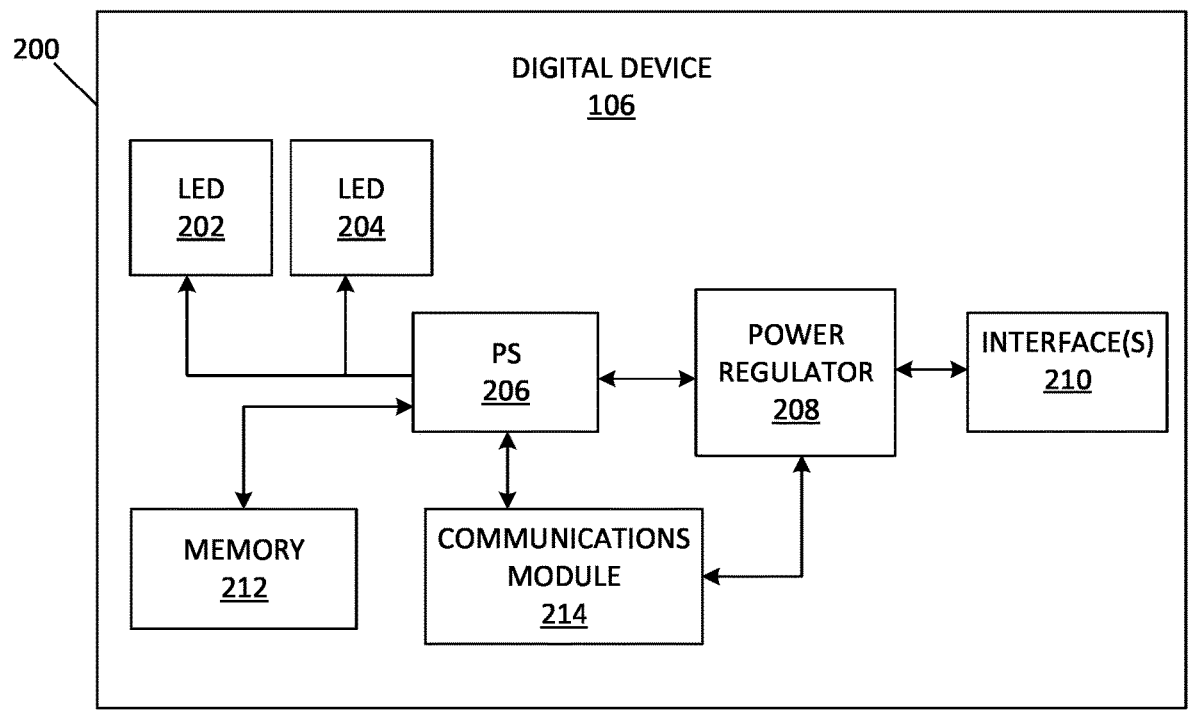
FIG. 2 is a schematic of a digital device as part of the system of FIG. 1.

Turning now to FIG. 2, a schematic depicts the digital device 106. The digital device 106 will include an exterior housing 200, which may vary in style and aesthetics, wherein the housing 200 is configured to house the hardware and software components of the digital device 106. The digital device 106 includes a processing unit 206 which is the core of the digital device 106 and implements the software instructions 110. In at least some embodiments, the processing unit 206 includes an advanced RISC machine (ARM) processor and filed-programmable gate array (FPGA) logic, however those skilled in the art will appreciate that alternates may be used, such as any analog processor (e.g., a Nano carbon-based processor) or a digital processor. In certain embodiments, the processing unit 206 may include one or more other processors, such as one or more microprocessors, and/or one or more supplementary co-processors, such as math co-processors.

The digital device 106 includes one or more LEDs presented from the housing 200, the one or more LEDs 202, 204 configured to provide status information as determined by the processing unit 206.

The digital device 106 also includes a memory 212 configured to operate with the processing unit 206 for implementation of the software instructions 110. The memory 212 can vary as would be understood by those skilled in the art. The memory 212 may include both operating memory, such as random access memory (RAM), as well as data storage, such as read-only memory (ROM), hard drives, optical, flash memory, or any other suitable memory/storage element. The memory 212 may include removable memory elements, such as a CompactFlash card, a MultiMediaCard (MMC), and/or a Secure Digital (SD) card. In certain embodiments, the memory 106 includes a combination of magnetic, optical, and/or semiconductor memory, and may include, for example, RAM, ROM, flash drive, and/or a hard disk or drive. The memory 212 may store instructions, such as part of the software instructions 110, for communicating with other systems and may store, for example, a program (e.g., computer program code) to direct processing unit 206 in accordance with the embodiments described herein. The instructions also may include program elements, such as an operating system. While execution of sequences of instructions in the program causes the processing unit 206 to perform the process steps described herein, hard-wired circuitry may be used in place of, or in combination with, software/firmware instructions for implementation of the processes of the present embodiments. Thus, unless expressly noted, the present embodiments are not limited to any specific combination of hardware and software.

Figure 9:
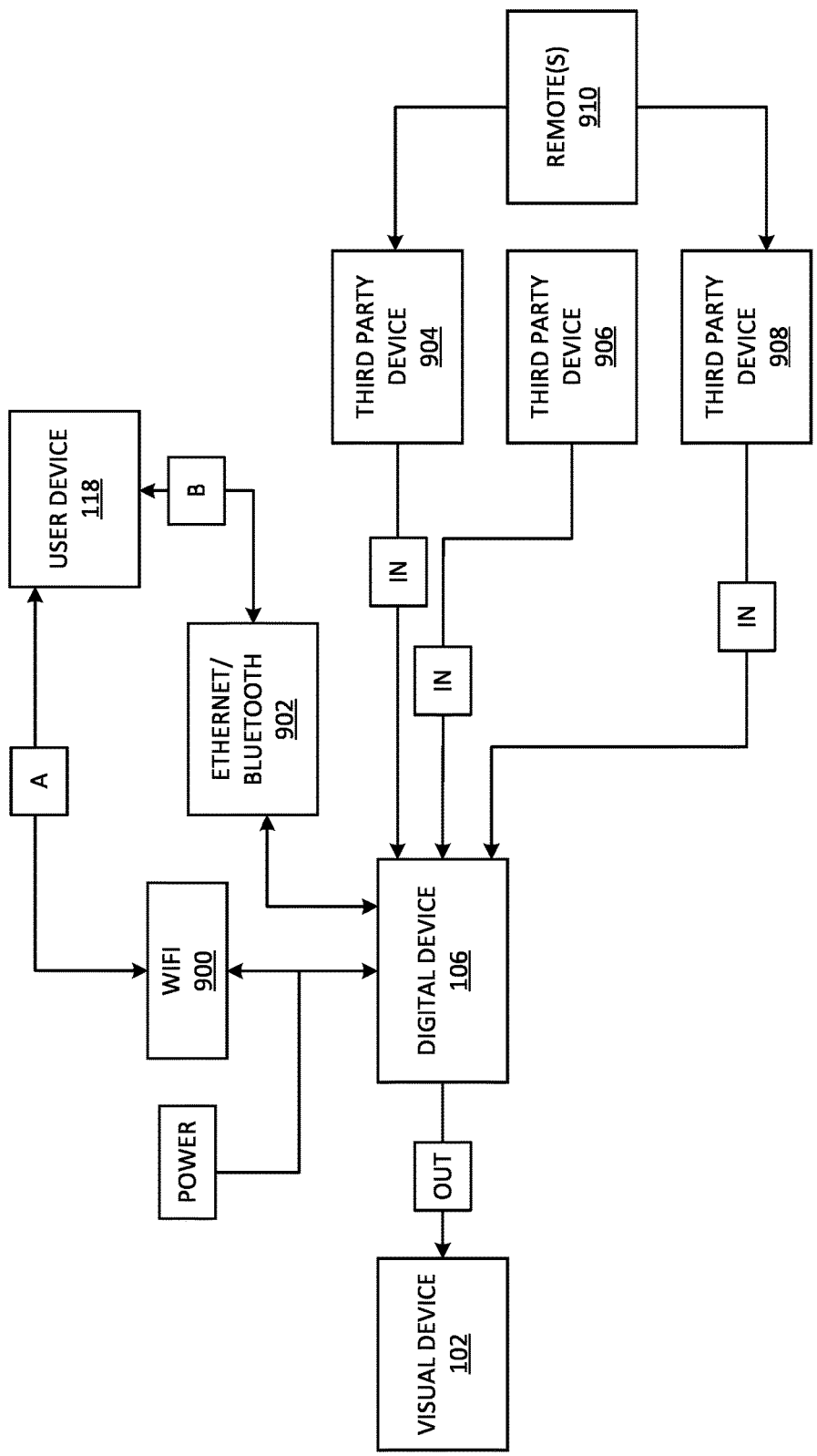
FIG. 9 is a block diagram depicting one contemplated arrangement of physical devices as part of the visual content replacement system of FIG. 1.

The digital device 106 also includes one or more interfaces 210 for creating a connection with the visual device 102 and/or any third party content serving hardware, as shown best in FIG. 9. For example, the one or more interfaces 210 may include HDMI ports, USB ports, or other physical connections that can allow for the digital device 106 to connect to the visual device 102 and/or third party devices 904, 906, 908. The interface(s) 210 can also include various buttons, screens, switch, etc. for presenting information and receiving commands from a user.

The digital device 106 further includes a communications module 214 to handle communication links between the digital device 106 and other external devices or receivers, including the visual device 102, server 108, and network 112, and to route incoming/outgoing data appropriately. The communication module 214 may include one or more transceiver modules and wired or wireless connections configured for transmitting and receiving data, and using, for example, one or more protocols and/or technologies, such as GSM, UMTS (3GSM), IS-95 (CDMA one), IS-2000 (CDMA 2000), LTE, FDMA, TDMA, W-CDMA, CDMA, OFDMA, Wi-Fi, RFID, WiMAX, 5G, or any other protocol and/or technology.

A power regulator 208 for facilitating fixed power outputs between the processing unit 206, the interface(s) 210, and communications module 214. Again, those skilled in the art will appreciate that the exact hardware and software combination is not limited and may be modified based on current or future technology without departing from the present invention.

Figure 3:
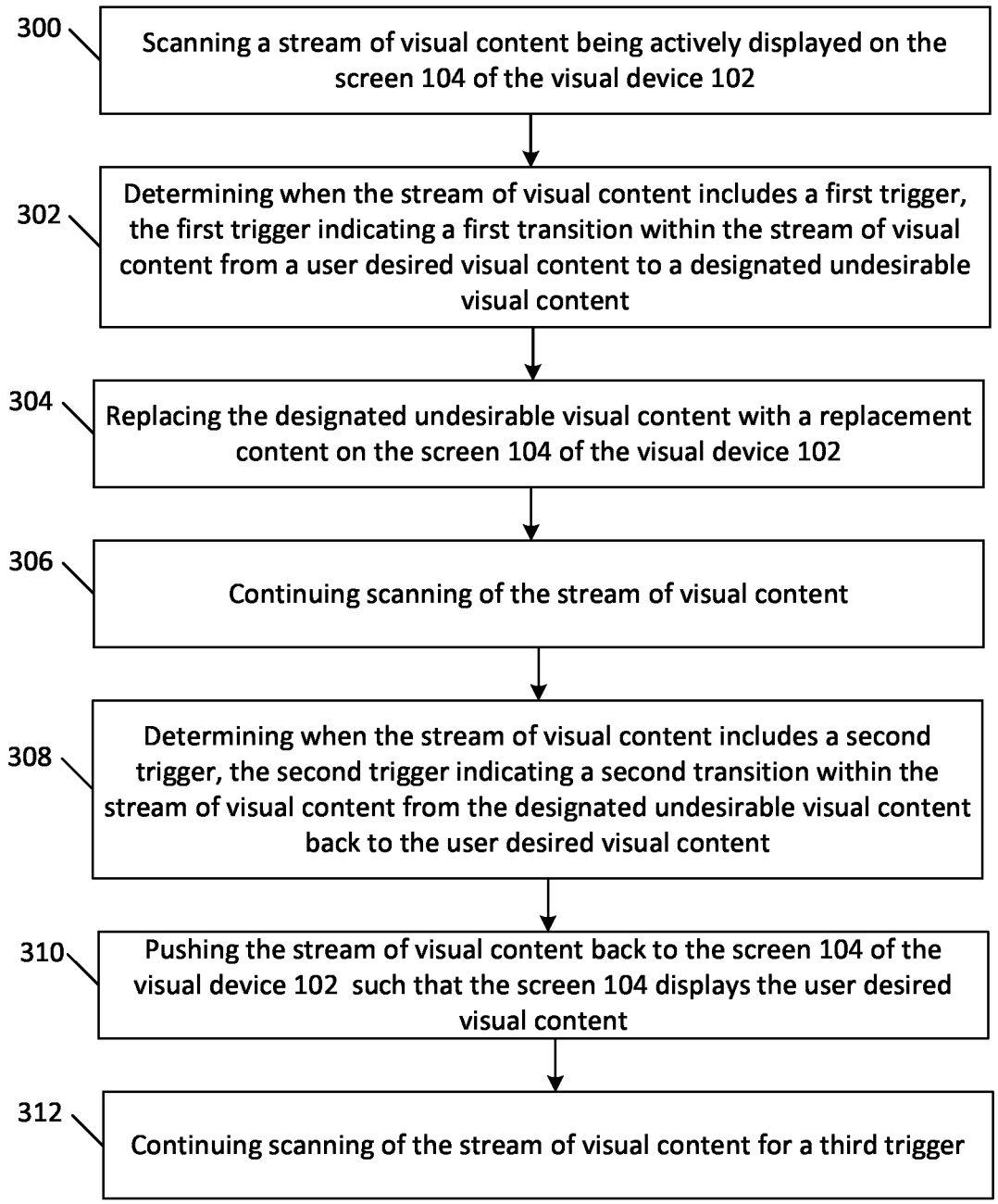
FIG. 3 is a flowchart of a method of visual content replacement as implemented through the system of FIG. 1.

Turning now to FIG. 3, a flowchart summarizes the method associated with system 100. At step 300, the digital device 106 is connected to the visual device 102 and scans the stream of visual content being actively displayed on the screen 104. The digital device 106 monitors the stream of visual content through the processing unit 206, which again implements the one or more software rules 110 to determine information about the stream of visual content.

At step 302, the digital device 106 determines when the stream of visual content includes a first trigger, the first trigger indicating a first transition within the stream of visual content from the user desired visual content to a designated undesirable visual content. As an example, a user may pre-set that all commercials are to be identified as undesirable visual content, accordingly, the digital device 106 operates to detect the first trigger, which indicates that the stream of visual content is transitioning from the user desired visual content (example: a playing movie) to commercials. Types of triggers and transitions are discussed in more detail herein.

At step 304, after such detection of the first trigger, the digital device 106 implements the one or more software rules 110 to replace the designated undesirable visual content with a replacement content. For example, as the digital device 106 detects the first trigger and therefore understands that there is a transition happening from a movie to commercials, the digital device 106 will replace the stream of visual content with replacement content on the screen 104 of the visual device. The replacement content can be user customized, such as playing music, a screensaver, a different program, or any other content.

At step 306, as the replacement content is playing, the digital device 106 continues to monitor the stream of visual content. At this point, the stream of visual content is not being presented on the screen 104 to the user, however, the digital device 106 is still monitoring said stream of visual content.

At step 308, the digital device 106 will again determine when the stream of visual content includes a second trigger, the second trigger indicating a second transition within the stream of visual content from the designated undesirable visual content back to the user desired visual content. For example, the second trigger could indicate the transition from a commercial back to a movie.

At step 310, after this second trigger is determined, the digital device 106 pushes the stream of visual content back to the screen 104 such that the screen 104 goes back to displaying the user desired visual content. Again, as an example, the digital device 106 will push the movie back to the screen to resume consumption by the user.

At step 312, the digital device 106 will continue scanning of the steam of visual content for another trigger. This process can continue through the entire consumption of the visual content by the user.

The triggers (first, second, third, etc.) of the present invention can be user defined, or may be pre-set by a device management system and team. The triggers are programmed into and implemented through the one or more software instructions 110. One contemplated trigger is a detection of a black frame as part of the stream of visual content. In many streams of visual content, it is common for the frame to go completely black in between a program (e.g. movie) and commercials. Accordingly, the software rule(s) 110 may be programmed to detect a black frame as one of the triggers indicating a transition within the stream of visual content.

In an embodiment of the digital device 106 utilizing black frame detection as a trigger, the following components incorporated as part of the processing unit 206 and interfaces 210, namely one or more IPcores, including DVI2RGB, Video In to AXI4 Stream, Video Timing Controller, AXI4 Stream to Video Out, and RGB2DVI. The content replacement algorithm as part of the software instructions 110 will also be used. The content replacement algorithm in embodiments specifically consists of black screen detection, timing detection, and machine learning algorithms. In addition, as part of the digital device 106, the processing unit 206 incorporates PYNQ-Z1 and uses a 1980×1080 (1080p) resolution. These components monitor the stream of visual content and receive RGB data bits and compares the RGB data bits to a minimum limit, which is perceived as black. This algorithm starts with the start of a frame pulse as part of the stream of visual content. As best demonstrated in FIG. 7, each end of the line is determined by a rising edge at the end of the line. For example, in a 1080p setting, the total pixel per line is 1920, and there are 1080 lines in a 1080p (FHD) setting. The content replacement algorithm through the digital device 106 will start examining each pixel as soon as the SOF pulse is detected. When the RGB data bits of the pixel is determined to be less than the minimum limit, it will be considered a black pixel and will become an increment of time as determined by the timing detection portion of the software instructions. This counter/increment will later be used for comparison by the one or more software rules 110. A rising edge of EOL at the last line, meaning 1080th, will initiate a comparison between incremented/counted black pixels. If the counted black pixels exceed a preset maximum limit of pixels and lines that are considered black, then the software rules 110 will send out a pulse to start the content replacement. This pulse will also be used to start timing detection. This timing works by comparing a predetermined length of the advertisement. This is used to avoid the mistake of turning off the content replacement while the advertisement is ongoing. In some embodiments, advertisements can also have a black screen at the start or end, marking a transitionary period such as between commercials or between a commercial and the user desired visual content. The timing algorithm as part of the software instructions 110 will start as soon as a pulse (indicating a black screen) arrives. This module has a counter that will start and stop, then reset at a predetermined length. In that way, the pulse coming from the black screen algorithm will be ignored until the counter stops. As the counter stops, a pulse coming from the black screen detection module will mark the end of content replacement and accordingly then return to the stream of visual content.

Another contemplated trigger is a change in an audio spectrum of the stream of visual content, such as a change to a different encoding or a volume change. Again, it is common that the audio spectrum of the stream of visual content could include a specific change, such as an increase in volume, indicative of a transition between user desired content and designated undesired content.

And yet another contemplated trigger is a change in color and/or picture elements, such as a change in color or color correction, with color grading analysis and spectrum analysis as part of the one or more software rules. As an example, the user desired visual content may include a specific color spectrum or filter, wherein the designated undesirable visual content includes either a different specific color spectrum or filter, and accordingly, the digital device 106 may be configured to detect this transition as a trigger.

Yet another contemplated trigger could be any pre-set trigger content type that could be identified through machine learning algorithms and smart content filtering. In other words, using a pre-trained model by a combination of images and audio processing as part of the one or more software instructions 110. As an example, one or more machine learning algorithms and smart content filtering may be able to detect a data point associated with the stream of visual content, such that a trigger is identified based on a learned module.

In a machine learning embodiment, the one or more software instructions include code designed to detect commercials in real-time using a pre-trained VGG16 model and a combination of image and audio processing techniques Pre-processing and Model Initialization: The code begins by defining a series of transformations that will be applied to input images before they are fed into the model. These transformations include resizing the image to a standard size, converting the image data to tensors, and normalizing the pixel values. The code may then initialize a custom VGG16 model, which, in some embodiments, has been pretrained on a dataset of commercials. The model is loaded with a state dictionary from a file 'best_model_checkpoint.pth' and set to evaluation mode. Image Processing: The code uses OpenCV to capture video frames from the visual device 102 and into the digital device 106, which are then pre-processed and fed into the model as part of the one or more software rules 110. A function is defined to detect black screens in the video frames, which can be useful for detecting the start and end of commercials. Audio Processing: The code uses the PyAudio and Audio libraries to capture and process audio data from the stream of visual content. This data is used to detect pauses in the audio, which can also be indicative of the start and end of commercials. Real-time Detection: The code continuously analyzes and processes video and audio data from the stream of visual content, feeding the processed images into the model for classification. The model's output is a probability distribution over the classes of commercials, and the class with the highest probability is selected as the predicted class. The code also includes a buffer for storing the labels predicted by the model, and every ten frames, the most common label in the buffer is printed to the console. Commercial Detection: The code uses a combination of the model's predictions, the detection of black screens, and the detection of audio pauses to detect the start and end of commercials (user designated undesirable content). When a said undesirable content is detected, the model starts running, and when the said undesirable content ends, the model stops running. In summary, this code is well-designed for its intended purpose of detecting commercials in real-time. It makes effective use of a pre-trained VGG16 model and combines this with image and audio processing techniques to achieve its goal.

Yet another contemplated trigger is a user implemented trigger, such as through the user device or an infrared remote. For example, when a commercial starts, a user may press a button or make another selection on a user device or remote, that gives a trigger command to the digital device and accordingly the digital device can use this command to make the switch between the designated undesired content and the user desired content.

The replacement content may take on a plurality of embodiments and may be customized by the user. For example, the user replacement content may be (1) a mute of the stream of visual content; (2) a single image screensaver; (3) a multiple image screensaver; (4) an alternate video from a database of videos; (5) an alternate video from an internet connection or third-party platform; (6) a music content from either a database, internet connection, or third party platform; or (7) a second channel from a content provider. These are merely examples of replacement content, and the replacement content may vary in embodiments.

Figure 4:
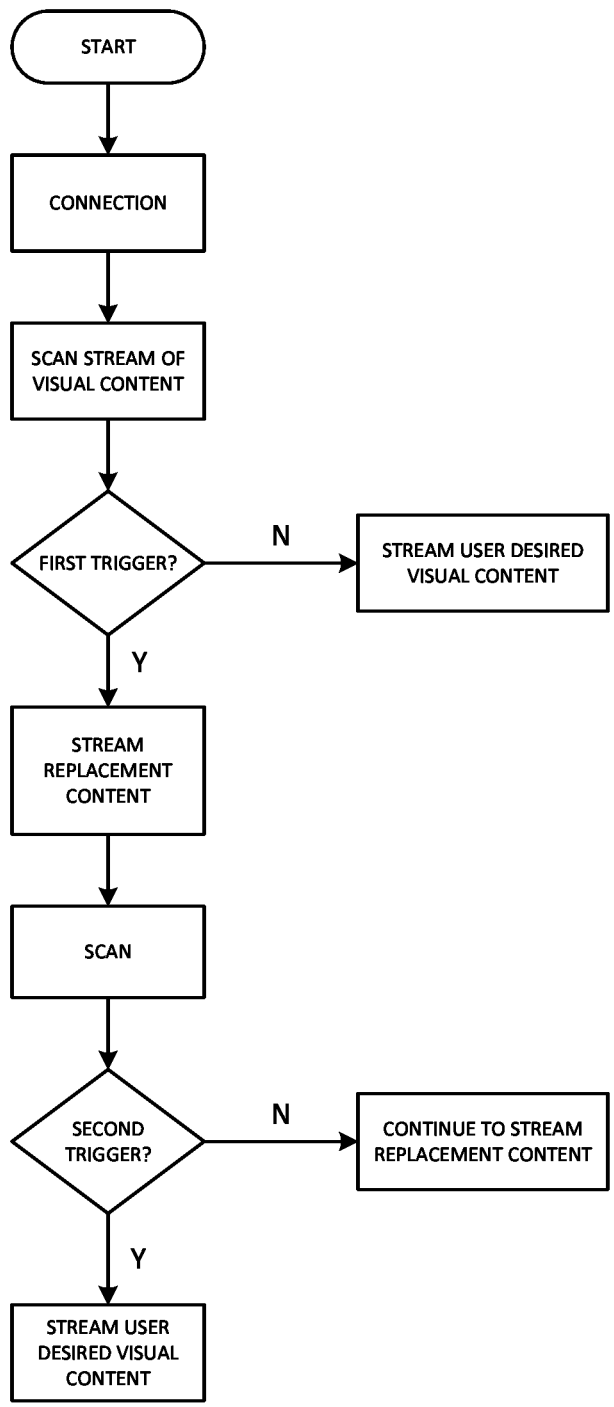
FIG. 4 is another flowchart of the method of visual content replacement as implemented through the system of FIG. 1.

In FIG. 4, another flowchart depicts the method of content replacement implemented through the system of FIG. 1. As shown, a connection is first established between the digital device 106 and the visual device 102. The digital device 106 scans the stream of visual content continuously. When the first trigger is detected, the digital device 106 switches to replacement content. However, until the first trigger is detected, the user desired visual content as part of the stream of visual content is displayed. The stream of visual content is continuously scanned for a second trigger, wherein the second trigger will cause switching back to the user desired visual content as part of the stream of visual content. This process continues to run so long as the user desires.

Figure 5:
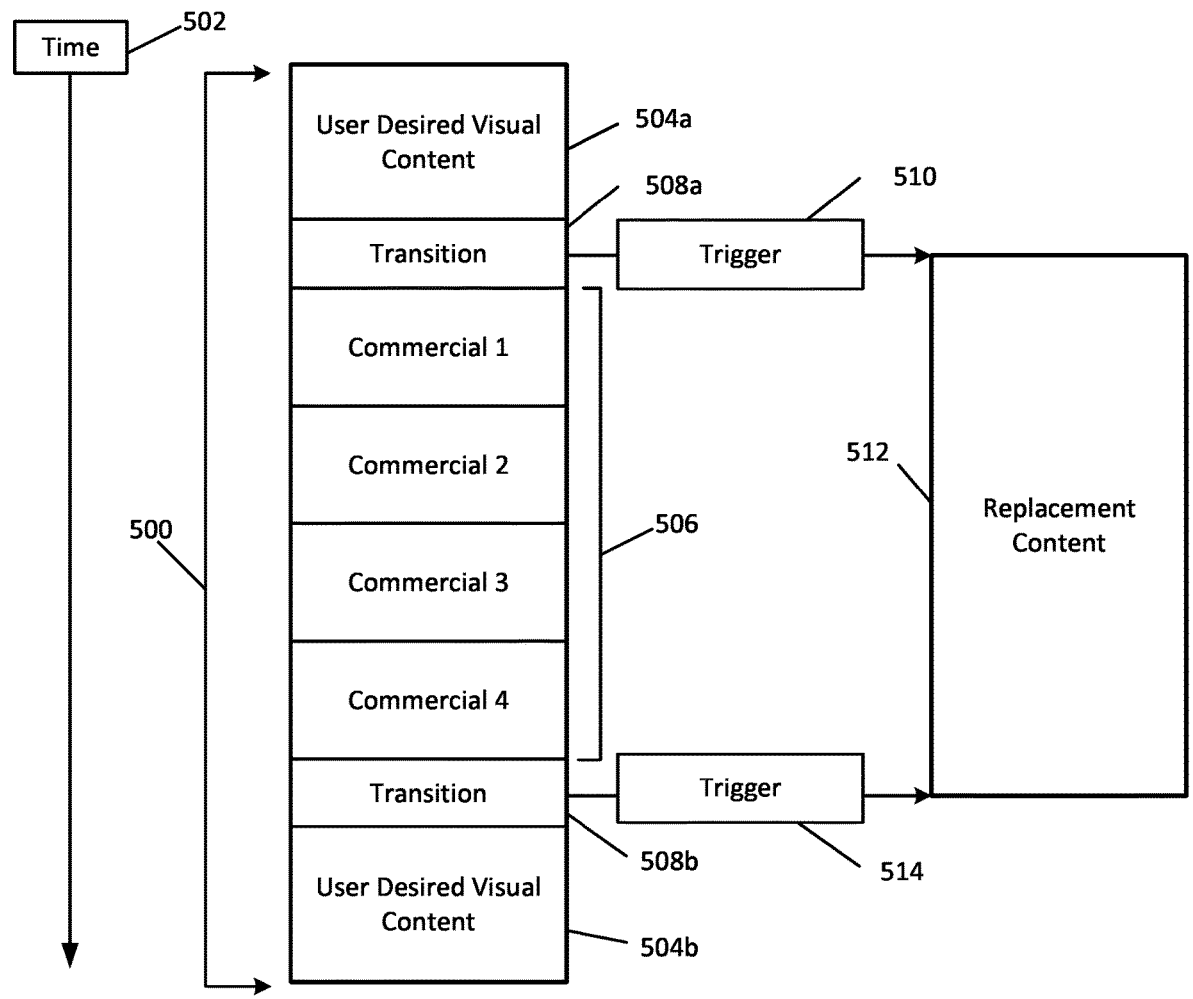
FIG. 5 is a schematic of a period of time demonstrating implementation of the visual content replacement system of FIG. 1.
Figure 6:
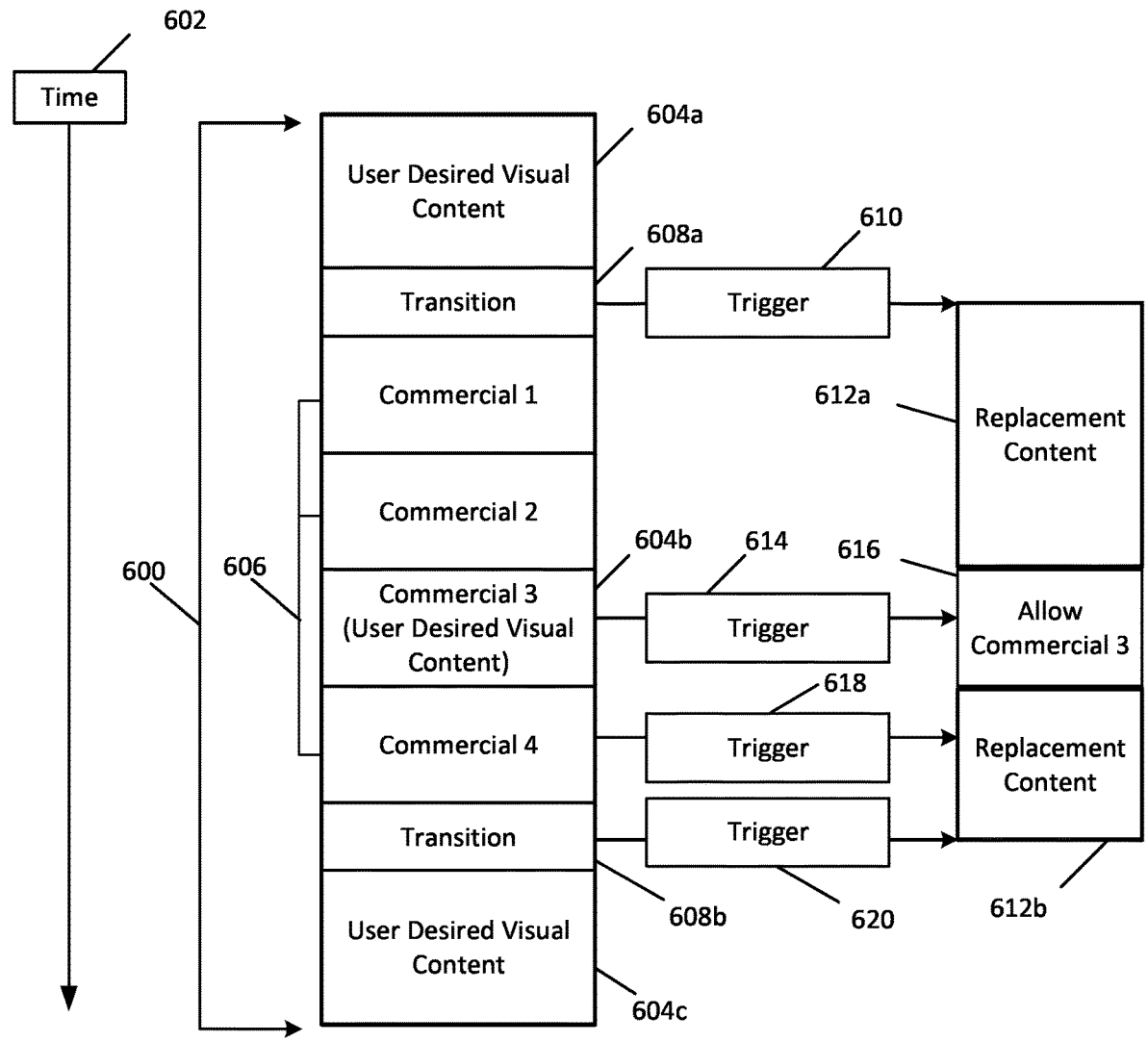
FIG. 6 is a schematic of a period of time demonstrating implementation of the visual content replacement system of FIG. 1 in an alternative method.

In FIGS. 5 and 6, two implementations of the method discussed above are shown for example. In FIG. 5, the stream of visual content 500 is represented over a period of time 502. As previously discussed, the stream of visual content 500 includes all content associated with a program selected by a user, such as a movie, sporting event, series, etc. In other words, the stream of visual content 500 includes user desired visual content 504a-b, designated undesirable visual content 506, and transitionary content 508a-b. As shown, the digital device 106 will detect a first trigger 510, which in embodiments is due to a transitionary content 508a, such as a black screen, and accordingly, the digital device 106 will then switch the screen 104 to replacement content 512. This replacement content 512 will then play until a second trigger 514 causes the digital device 106 to switch back to the user desired visual content 504b. Again, in this particular embodiment, a transitionary content 508b may be the cause of the second trigger 514. As previously discussed, the triggers 510, 514 may be determined by varying means, such as through machine learning, audio changes, or the like.

In FIG. 6, another example is shown, again having the stream of visual content 600 represented over a period of time 602. Again, the stream of visual content 600 includes the user desired visual content 604a-c, designated undesirable visual content 606, and transitionary content 608a-b. Here, one or more machine learning algorithms are used, such as to determine that commercial 3 is in fact user desired visual content. Accordingly, in this embodiment, a first trigger 610 will cause the start of replacement content 612a. Then a second trigger 614, which in this case is a detection of a desired commercial, will switch back to the stream of visual content 600 such that commercial 3 is allowed to play 616. Then, another trigger 618, which may be the detection of an undesired commercial, causes the switch back to replacement content 612b. Yet further, another trigger 620, will again switch back to the stream of visual content 600 as shown. Accordingly, this figure demonstrates that any number of customized triggers may be set up such that a user can continuously consume desired content. For example, based on a machine learning, a user might set up that they desire for the digital device 106 to skip all commercials except those pertaining to sports. Based on the machine learning, the digital device 106 can then recognize a commercial involving sports, and allow said commercial to play.

Figure 7:
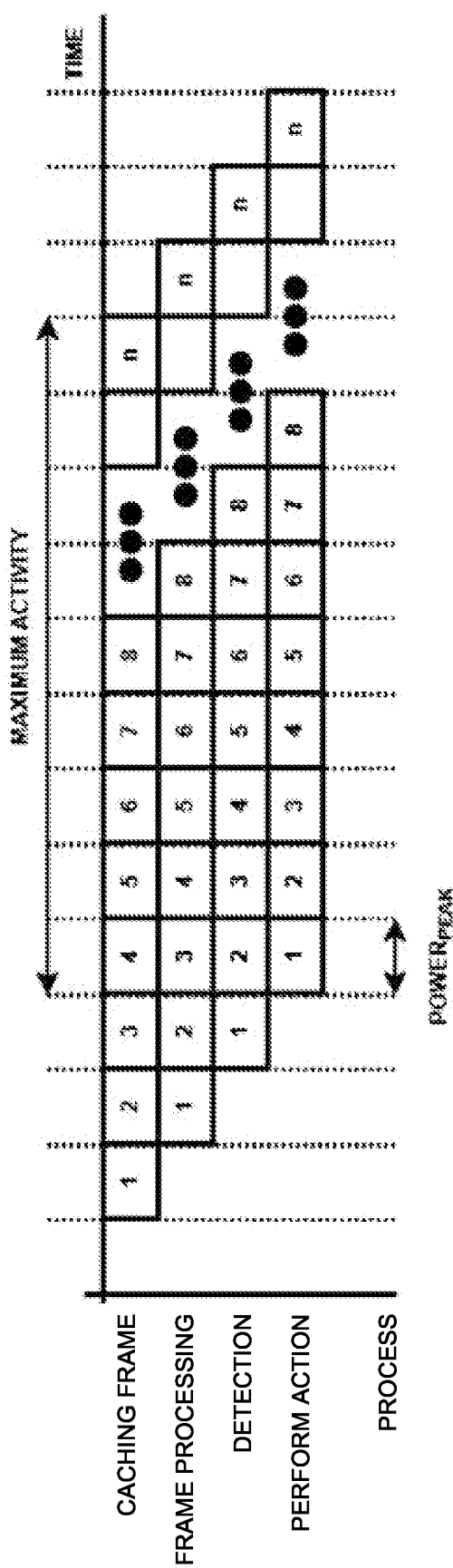
FIG. 7 is a chart demonstrating time periods associated with implementation of the system of FIG. 1 and the method of FIGS. 2 and 3.

In FIG. 7, a chart depicts a pipelined operation implemented through the digital device 106, one or more software instructions 110, and server 108. This chart pipelined operation ensures that the user faces no framerate loss or performance issues while the digital device 106 is configured and running. This ensures that the one or more software instructions 110 and associated hardware can quietly compute in the background with no performance loss to the stream of visual content. As shown, the digital device 106 quickly analyzes a frame, processes said frame, detects the presence or absence of a trigger (as discussed above), and then performs an action (leaves the stream of visual content or switches to replacement content on the digital device or from a third party). A switch seamlessly changes the content to the replacement content that is served from the digital device 106. The switch's input is the output of detection of a trigger, such as through commercial detection algorithms discussed above. Cached frames are available for other processing such as black-frame detection and/or ML applications hosted on servers.

Figure 8:
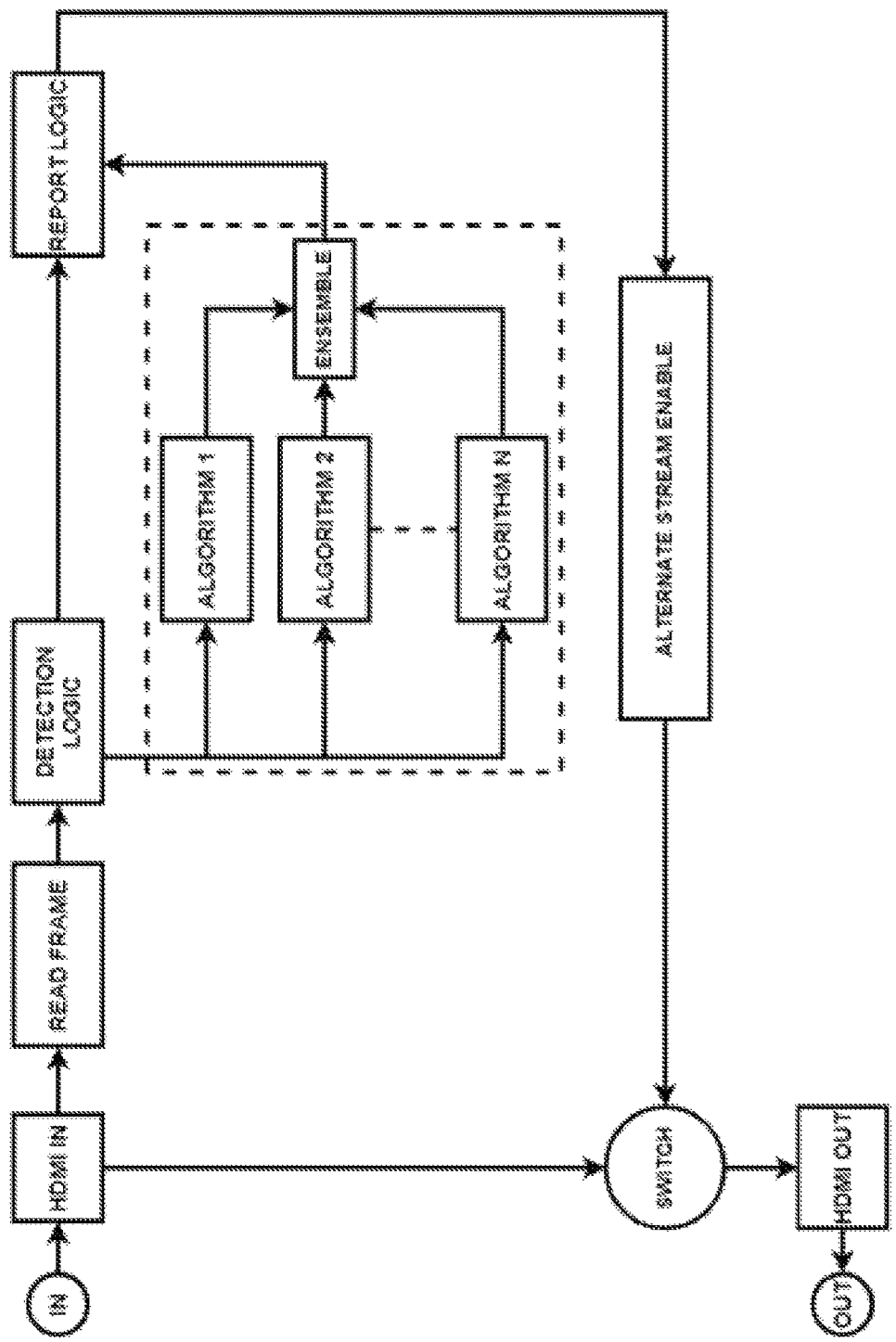
FIG. 8 is a diagram depicting parallel processing as part of the digital device of FIG. 1.

In FIG. 8, a process flow further depicts this methodology. Specifically, the digital device 106 is connected to the visual device 102 and/or one or more third party devices, such as via an HDMI port or USB connection. Through this connection, each frame is read by the detection logic, the detection logic including the one or more software rules (represented with algorithms 1-N). The detection logic accordingly determines when an alternative stream is enabled (replacement content), and accordingly makes switches as appropriate. This Figure depicts the parallel processing power capable from the processing unit 206 of the digital device 106, specifically in embodiments, the filed-programmable gate array (FPGA) logic as part of the processing unit 206. The input HDMI stream is tied to the output HDMI stream which means that the user would not see any performance loss in the stream. The configurable logic i.e., FPGA, reads frames and passes the information to the supported algorithms in hardware for commercial detection.

In FIG. 9, a block diagram depicts one contemplated arrangement of physical devices as part of the system 100. As shown, the digital device 106, in embodiments, is an independent entity physically connected to the visual device 102, such as through an HDMI connection. The digital device 106 is then physically connected to one or more third party devices 904, 906, 908, again via HDMI or USB connections as appropriate. Each of the third party devices 904, 906, 908 may communicate with one or more remotes 910 such that commands are received therefrom. Accordingly, the digital device 106 is monitoring the visual content transmitted from the one or more third party devices 904, 906, 908 to replace content as discussed above. As an example, the third party devices 904, 906, 908 may be one of cable, DirecTV®, AppleTV®, Roku®, Firestick®, etc. Those skilled in the art will appreciate that this list is exemplary and non-limiting. As further shown, the digital device 106 can communicate with the user device 118 through one or more pathways (A and B), for example through a WiFi connection 900 or through an ethernet/Bluetooth connection 902. Accordingly, the user device 118 can transmit command and information to the digital device 106.

In alternative embodiments it is contemplated that the third party devices 904, 906, 908 and the digital device 106 are combined into a single unit. In other words, the digital device 106 can provide content replacement as discussed above, as well as streaming and content providing that is known and common of said third party devices. In yet additional alternative embodiments, the visual device 102 and digital device 106 are combined into a single unit. Yet further, in some embodiments, the visual device 102, digital device 106, and any third party devices 904, 906, 908 are combined into a single unit. In other words, the exact arrangement of physical devices does not define the present invention.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure. It will be understood that certain features and subcombinations are of utility and may be employed without reference to other features and subcombinations. Not all steps listed in the various figures need be carried out in the specific order described.

The invention claimed is:

1. A visual content replacement system, comprising:
a visual device with a screen;
a digital device in digital communication with the visual device, the digital device having a processing unit to execute one or more software instructions therefrom;
a server in digital communication with the digital device, the server providing the one or more software instructions for execution by the processing unit;
the processing unit, in combination with the one or more software instructions, performing the steps of:
scanning a stream of visual content being actively displayed on the screen of the visual device;
determining when the stream of visual content includes a first trigger, the first trigger indicating a first transition within the stream of visual content from a user desired visual content to a designated undesirable visual content;
replacing the designated undesirable visual content with a replacement content on the screen of the visual device;
continuing scanning of the stream of visual content;
determining when the stream of visual content includes a second trigger, the second trigger indicating a second transition within the stream of visual content from the designated undesirable visual content back to the user desired visual content;
pushing the stream of visual content back to the screen of the visual device such that the screen of the visual displays the user desired visual content; and
continuing scanning of the stream of visual content for a third trigger;
wherein the first trigger is a black frame as part of the stream of visual content and wherein determining when the stream of visual content includes the black frame as indicative of the first transition further comprises:
using a black screen detection technology to monitor RGB data bits of the stream of visual content and comparing the RGB data bits to a minimum limit such that when the RGB data bits is determined to be less than the minimum, a first black pixel for a first increment of time is counted;
using a timing detection technology to count a plurality of black pixels as determined by the black screen detection technology until a preset number of black pixels is reached; and
sending, after the preset number of black pixels is reached, a pulse to begin replacing the designated undesirable visual content with the replacement content.

2. The system of claim 1, wherein the digital device further comprises:
a housing configured to house one or more hardware components;
one or more light emitting diodes (LEDs) presented from the housing, the one or more LEDs configured to provide status information as determined by the processing unit;
an interface for facilitating communication between the visual device and the digital device;
a communications module configured to facilitate communication between the digital device and the server;
a memory configured to aid in facilitation of processing the one or more software instructions; and
a power regulator for facilitating fixed power outputs between the processing unit and the interface.

3. The system of claim 2, wherein the interface further comprises one or more HDMI ports configured to allow a wired connection between the digital device and the visual device.

4. The system of claim 2, wherein the processing unit comprises an advanced RISC machine (ARM) processor and field programmable gate array (FPGA) logic.

5. The system of claim 2, wherein the communications module further comprises WiFi and Bluetooth technology.

6. The system of claim 1, wherein the second trigger is a change in an audio spectrum as part of the stream of visual content.

7. The system of claim 1, wherein the one or more software instructions further comprise one or more machine learning algorithms, the one or more machine learning algorithms configured to aid in determining when the stream of visual content includes the second first trigger.

8. The system of claim 1, further comprising:
a user device in digital communication with the digital device, the user device having:
a user interface configured to provide one or more options for selection and manipulation by a user, the one or more options including a replacement content selection option configured to allow the user to customize the replacement content.

9. The system of claim 1, wherein the replacement content is selected from a group consisting of: (1) a muted audio track; (2) a single image screensaver; (3) a slideshow of images; (4) an alternate video; (5) a music selection; and (6) a second channel from a content provider.

10. A method of replacing visual content, the method comprising:
providing a digital device with a processing unit configured to execute one or more software instructions, the digital device in digital communication with a server;
connecting the digital device with a visual device such that the digital device such that the digital device monitors a stream of visual content;
scanning the stream of visual content being actively displayed on a screen of the visual device via the digital device;
determining when the stream of visual content includes a first trigger via the one or more software rules, the first trigger indicating a first transition within the stream of visual content from a user desired visual content to a designated undesirable visual content;
replacing the designated undesirable visual content with a replacement content on the screen of the visual device via the digital device;
continuing scanning of the stream of visual content via the digital device;
determining when the stream of visual content includes a second trigger via the one or more software rules, the second trigger indicating a second transition within the stream of visual content from the designated undesirable visual content back to the user desired visual content;

pushing the stream of visual content back to the screen of the visual device via the digital device such that the screen of the visual device displays the user desired visual content; and continuing scanning of the stream of visual content for a third trigger;

wherein the first trigger is a black frame as part of the stream of visual content and wherein determining when the stream of visual content includes the black frame as indicative of the first transition further comprises:

using a black screen detection technology to monitor RGB data bits of the stream of visual content and comparing the RGB data bits to a minimum limit such that when the RGB data bits is determined to be less than the minimum, a first black pixel for a first increment of time is counted;

using a timing detection technology to count a plurality of black pixels as determined by the black screen detection technology until a preset number of black pixels is reached; and sending, after the preset number of black pixels is reached, a pulse to begin replacing the designated undesirable visual content with the replacement content.

11. The method of claim 10, wherein the digital device further comprises:

a housing configured to house one or more hardware components;

one or more light emitting diodes (LEDs) presented from the housing, the one or more LEDs configured to provide status information as determined by the processing unit;

an interface for facilitating communication between the visual device and the digital device;

a communications module configured to facilitate communication between the digital device and the server;

a memory configured to aid in facilitation of processing the one or more software instructions; and a power regulator for facilitating fixed power outputs between the processing unit and the interface.

12. The method of claim 11, wherein the communications module further comprises WiFi and Bluetooth technology.

13. The method of claim 11, wherein connecting the digital device with the visual device is accomplished via one or more HDMI ports and a wired connection between the digital device and the visual device.

14. The method of claim 10, wherein the central processing unit comprises an advanced RISC machine (ARM) processor and field programmable gate array (FPGA) logic.

15. The method of claim 10, wherein the second trigger is a change in an audio spectrum as part of the stream of visual content.

16. The method of claim 10, wherein the one or more software instructions further comprise one or more machine learning algorithms, the one or more machine learning algorithms configured to aid in determining when the stream of visual content includes the second trigger.

17. The method of claim 10, further comprising:

connecting a user device digitally to the digital device, the user device having a user interface configured to provide one or more options for selection and manipulation by a user, the one or more options including a replacement content selection option configured to allow the user to customize the replacement content.

18. The method of claim 10, wherein the replacement content is selected from a group consisting of: (1) a muted audio track; (2) a single image screensaver; (3) a slideshow of images; (4) an alternate video; (5) a music selection; and (6) a second channel from a content provider.

* * * * *